(12) United States Patent
Bilac et al.

(10) Patent No.: US 6,661,632 B2
(45) Date of Patent: Dec. 9, 2003

(54) DATA ACQUISITION SYSTEM FOR A CIRCUIT BREAKER

(75) Inventors: Mario Bilac, Lawrenceville, GA (US); Peter Spenlove Staley, Kings Park, NY (US)

(73) Assignee: Siemens Energy & Automation, Inc., Norcross, GA (US)

( * ) Notice: Subject to any disclaimer, the term of this patent is extended or adjusted under 35 U.S.C. 154(b) by 0 days.

(21) Appl. No.: 10/184,221

(22) Filed: Jun. 27, 2002

(65) Prior Publication Data

US 2002/0181174 A1 Dec. 5, 2002

Related U.S. Application Data

(62) Division of application No. 09/434,748, filed on Nov. 5, 1999, now Pat. No. 6,462,921.

(51) Int. Cl.[7] .............................. H02H 3/00; H02H 7/00
(52) U.S. Cl. ..................... 361/93.2; 361/18; 361/78; 340/825.22; 340/3.1
(58) Field of Search .................. 361/18, 20–21, 361/93.1, 93.2, 78, 100; 323/284; 340/3.1, 825.22

(56) References Cited

U.S. PATENT DOCUMENTS

| 4,631,625 A | 12/1986 | Alexander et al. |
|---|---|---|
| 4,751,605 A | 6/1988 | Mertz et al. |
| 4,870,531 A | 9/1989 | Danek |
| 4,947,126 A | 8/1990 | May et al. |
| 5,029,269 A | 7/1991 | Elliott et al. |
| 5,239,144 A | 8/1993 | Robbins et al. |
| 5,274,577 A | 12/1993 | Hinrichs |
| 5,381,119 A | 1/1995 | Robbins et al. |
| 5,426,592 A | 6/1995 | Leone et al. |
| 5,617,286 A | 4/1997 | Jenkins |
| 5,740,027 A | 4/1998 | Akers et al. |
| 5,754,386 A | 5/1998 | Barbour et al. |
| 5,889,663 A | 3/1999 | Tabata et al. |
| 5,907,467 A | 5/1999 | Barbour |
| 5,940,257 A | 8/1999 | Zavis |
| 6,028,755 A | 2/2000 | Saeki et al. |
| 6,047,346 A | 4/2000 | Lau et al. |
| 6,141,199 A | 10/2000 | Fornari |
| 6,148,198 A | 11/2000 | Anderson et al. |

OTHER PUBLICATIONS

European Search Report for Application No. EP 00 20 3783, dated May 27, 2002.

*Primary Examiner*—Kim Huynh
(74) *Attorney, Agent, or Firm*—Foley & Lardner

(57) ABSTRACT

A circuit breaker system 10 (FIG. 1) using electronic trip units 35 is disclosed. The electronic trip units 35 are coupled to a communications bus 30 whereby the electronic trip units 35 can be reconfigured, controlled, and/or monitored by a central computer. Further, the electronic trip units 30 include a data acquisition circuit 100 (FIG. 4) that uses chopping to provide better accuracy and increased dynamic range of current measurements.

5 Claims, 5 Drawing Sheets

DATA ACQUISITION SYSTEM FOR A CIRCUIT BREAKER

REFERENCE TO RELATED PATENT APPLICATIONS

This is a division of U.S. application No. 09/434,748, now U.S. Pat. No. 6,462,921, which was filed on Nov. 5, 1999, and issued on Oct. 8, 2002, and is incorporated herein by reference in its entirety.

FIELD OF THE INVENTION

The present invention relates generally to electric powered trip units, such as circuit breakers and more particularly to signal conditioning and data acquisition circuitry used to collect data representative of conditions in the circuit breaker.

BACKGROUND OF THE INVENTION

In a typical factory-power distribution system, power is generated by a power generation company and supplied to a factory and thereafter distributed around the factory to various equipment such as, for example, motors, welding machinery, computers, heaters, lighting, and the like.

Power distribution systems of this type are typically centrally located in switch gear rooms or substations. From there, power is divided up into branches such that each branch supplies power to a portion of the factory and/or specified loads. Frequently, transformers are disposed throughout the factory to step down the supply voltage to that required by specific pieces of equipment or portions of the factory. Therefore, a factory-power distribution system typically has a number of transformers servicing various types of equipment in various areas. Inherent with this, is the high cost of the power-distribution equipment such as transformers, as well as the cost of the equipment to which power is being supplied. Therefore, it is quite common to provide protective devices such as circuit breakers or fuses in at least each branch so that not only may each piece of equipment be protected but any problems associated with one piece of equipment does not ripple to adjacent or interconnected pieces of equipment. Further, providing fuses or circuit breakers in each branch can help minimize down time since specific loads may be energized or de-energized without affecting other loads thereby creating increased efficiencies, lower operating and manufacturing costs and the like.

Typically, when circuit breakers are utilized, they are used to detect more than just large overcurrent conditions caused by short circuit faults. In addition, they frequently detect lower level long-time overcurrent conditions and excessive ground currents. The simplest form of circuit breakers are thermally tripped as a result of heating caused by overcurrent conditions and, in this regard, are basically mechanical in nature. These mechanical-type breakers are incorporated into almost all circuit breakers, regardless of whether or not additional advanced circuitry is provided since they are extremely reliable over a long life cycle and provide a default trip-type level of protection.

Some types of circuit breakers utilize electronic circuitry to monitor the level of current passing through the branch circuits and to trip the breaker when the current exceeds a pre-defined maximum value. Electronic circuit breakers are adjustable so as to fit a particular load or condition by the end user without designing or specifying different breakers. Breakers of this type typically include a microcontroller coupled to one or more current sensors. The microcontroller continuously monitors the digitized current values using a curve which defines permissible time frames in which both low-level and high-level overcurrent conditions may exist. If an overcurrent condition is maintained for longer than its permissible time frame, the breaker is tripped.

Microcontrolled breakers may also include the ability to calculate root mean square (RMS) current values. This is necessary in order to prevent erroneously tripping a circuit breaker when a non-linear load, such as a welding machine, is coupled to the branch that it is protecting. The reason for this is that non-linear loads tend to produce harmonics in the current waveform. These harmonics tend to distort the current waveform, causing it to exhibit peak values which are augmented at the harmonic frequencies. When the microcontroller, which assumes that the current waveform is a sinusoidal current waveform, detects these peaks it may therefore trip the breaker even though the heating effect of the distorted waveform may not require that the circuit be broken.

Further, microcontrollers in some circuit breakers are used to monitor and control or account for other types of faults, such as over or under voltage conditions and phase loss or imbalances. Such microcontrollers operate solenoids which are operatively connected to the trip mechanism of the circuit breaker. Therefore, while the thermal overload (mechanical) portion of the breaker will operate the trip mechanism, the solenoid will operate at the instruction of the microcontroller (or sometimes also at the instruction of external signals) to allow the trip mechanism to trip the associated circuit breaker.

Further, as a result of the flexibility and breadth of protection that microcontrollers can provide when used in conjunction with circuit breakers, their use in circuit breakers is becoming more and more prevalent to the point of being standard. However, this presents another problem in that microcontrollers and the associated circuitry require power. Such power may be typically provided in one of three ways or a combination thereof: batteries, externally-supplied power, or power provided by potential transformers. Most circuit breakers include one power supply having a battery back-up for supplying all of the controllers for the entire substation or switch gear closet.

Moreover, the monitoring of power characteristics is being demanded more and more frequently in load control equipment and particularly in Molded Case Circuit Breakers (MCCB) as is frequently found in use in industry. Such power components include, RMS and peak voltage, current and power, either by phase or in total, and power factor related components. For examples, utilities and industrial customers are increasingly interested in performing end-use load studies. These studies typically include collecting interval power data so as to monitor and control energy consumption. While this is often done at a main load center, due to the increased costs and problems associated with time of use power consumption, such monitoring is being done closer to the individual end-use loads (i.e., motors, etc.). In this fashion, industrial customers are given a financial incentive to curtail power consumption when the cost of power is high as well as being able to more carefully and cost-effectively manage their power consumption by knowing where in their plant significant amounts of energy are being used.

During power monitoring, a discrete energy transducer is installed on the equipment or circuit to be monitored. This transducer generates a digital pulse output via a mechanical or solid state relay with the frequency of the pulse output being proportional to the magnitude of the measured quantity. This digital pulse output is either hard wired or communicated via a power line-carrier system to a discrete pulse data recording device where it is time stamped.

Because it is desired to do monitoring of currents using discrete energy transducers, such as current transformer (CTs), it is desirable to receive a clean or noiseless signal in the data acquisition devices. Thus, there is a need for electronic circuitry which allows for a substantially clean signal to be communicated to data acquisition hardware. Further, there is a need for an electronic circuit which provides for a clean signal to be provided to measurement devices.

SUMMARY OF THE INVENTION

One embodiment of the invention relates to a data acquisition system for a circuit breaker. The data acquisition system includes a signal source providing a source signal, a microprocessor, and a signal conditioning circuit coupled to the microprocessor and configured to receive a periodic signal from the microprocessor. The data acquisition system also includes a chopping circuit coupled to the signal conditioning circuit and coupled to the signal source, the configured to chop the source signal in response to the periodic signal.

Another embodiment of the invention relates to a chopping circuit coupled to a signal source, the signal source providing a source signal. The chopping circuit includes a signal conditioning circuit receiving a periodic signal, a measurement branch coupled to the signal source, and a switching branch coupled to the signal conditioning circuit and coupled to the signal source. The switching branch is switched in response to the periodic signal and measurement, across the measurement branch, is carried out in response to the periodic signal.

Yet another embodiment of the invention relates to a circuit breaker. The circuit breaker includes a transducer providing a source signal representative of current flowing through the circuit breaker and an electronic trip unit including a data acquisition circuit having a sampling frequency. The data acquisition circuit includes a microprocessor having a clock frequency, a signal conditioning circuit coupled to the microprocessor and receiving a periodic signal from the microprocessor, and a chopping means coupled to the signal conditioning circuit and coupled to the current transducer. The chopping means chops the source signal in response to the periodic signal, to provide a measurement signal.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
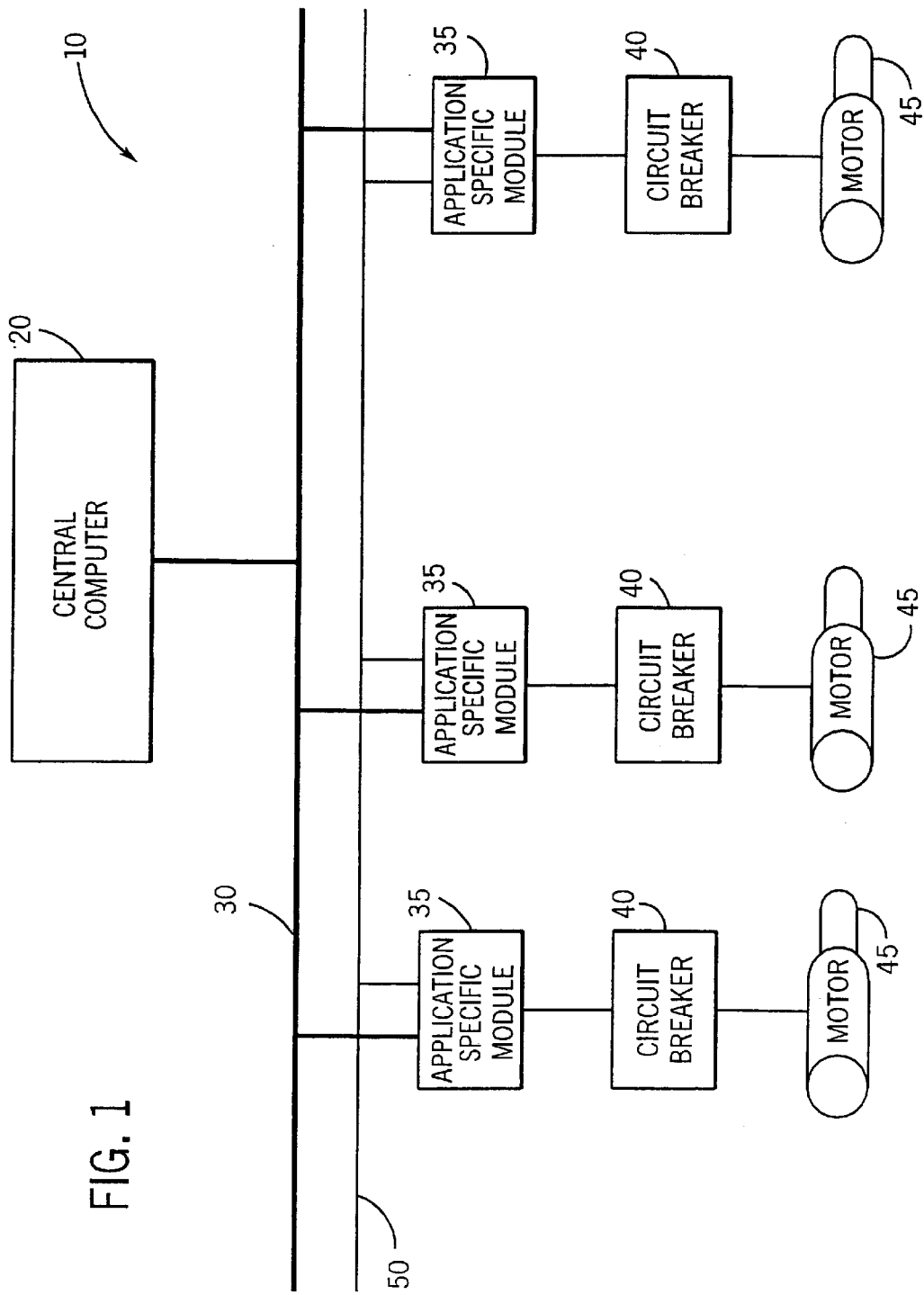
FIG. 1 is a block diagram of a circuit breaker communication, monitoring, and control system.

Referring now to FIG. 1, a block diagram of a preferred embodiment of a circuit breaker communication, monitoring and control system 10 is depicted. System 10 includes a central computer 20 which may be any type of centralized data processing unit including, but not limited to a personal computer, a work station, a computer server, or a dedicated data processing device. Central computer 20 is coupled to a communications bus 30. Communications bus 30 may be any of a wide array of standard communications bus architectures including, but not limited to Ethernet, RS-485, fiber optic architectures, or other applicable bus architectures. Communications bus 30 may use any of a number of applicable communications protocols including, but not limited to profibus, profibus DP, TCP/IP, or any other applicable communications protocol.

Communications bus 30 is coupled to and in communication with a plurality of application specific modules 35 which are interfacing devices between communications bus 30 and a circuit breaker 40. Circuit breaker 40 is coupled to a load such as motors 45. In a preferred embodiment, circuit breaker 40 may be a Molded Case Circuit Breaker (MCCB), but alternatively circuit breaker 40 may be other types of circuit breakers. Circuit breaker 40 may be coupled to any of a variety of load types including, but not limited to, motors 45, welders, computers, heaters, lights, or any other type of electrical equipment.

Circuit breaker 40 is configured to interrupt current flow to motor 45 or any applicable load when any of a variety of overload conditions are detected. Circuit breaker 40 may be tripped either by a short circuit condition, or by electronically sensing an overload condition, the overload condition being preprogrammed into the circuit breaker electronics. Trip types may include, but are not limited to, overload trips, short time trips, ground fault trips, and instantaneous trips.

Figure 2:
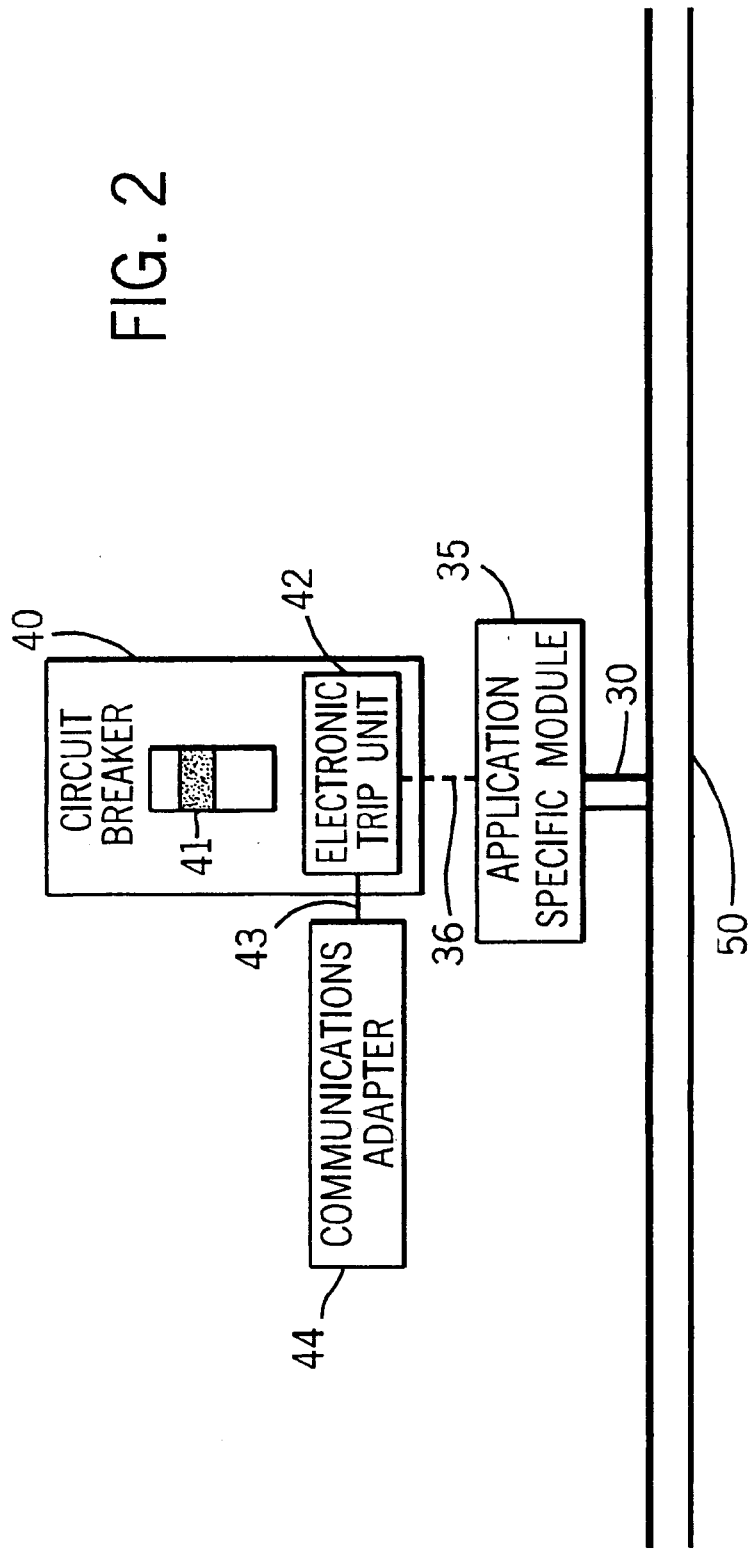
FIG. 2 is a block diagram of a circuit breaker having an application specific module in communication with an external communications bus.

Referring now to FIG. 2, circuit breaker 40 is depicted as having a circuit breaker handle 41 for manual tripping or resetting of circuit breaker 40. Further, circuit breaker 40 has an electronic trip unit 42, which in a preferred embodiment includes a liquid crystal display (LCD) readout or may include any other type of display. Electronic trip unit 42 may be programmed to cause current interruption when any of a variety of overload conditions is sensed by the electronic trip unit. For example, electronic trip unit 42 may be programmed to interrupt current when a specified root means square (RMS) current value is reached. Further, other types of overload conditions may be specified.

Figure 3:
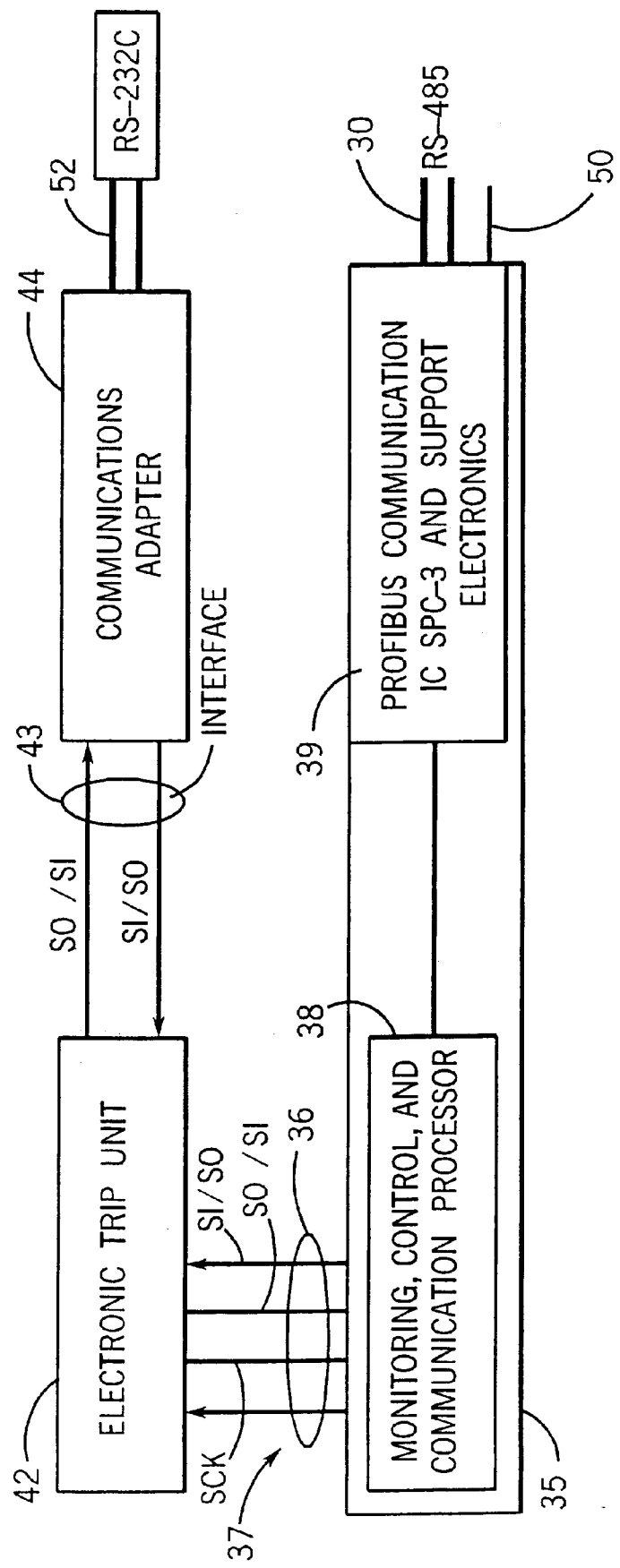
FIG. 3 is a block diagram of the circuit breaker of FIG. 2 showing the communication lines in more detail.

In a preferred embodiment, electronic trip unit 42 includes an interface 43 for a communications adapter 44. Communications adapter 44 may be coupled to a personal computer, or other data processing device or further may be coupled to any of a variety of communications buses or communication devices. Communications adapter 44 allows an attached communications or data processing device to download information from electronic trip unit 42 or alternatively allows communication with electronic trip unit 42 to program electronic trip unit 42 for any of a variety of internal settings. Interface 43 between electronic trip unit 42 and communications adapter 44 may be any of a variety of serial output/serial input (SO/SI), serial input/serial output (SI/SO) communications lines 43, as depicted in FIG. 3. Further, communications adapter 44 preferably uses a serial interface 52, such as serial interface RS-232C as depicted in FIG. 3. Interface 43 and interface 52 are not limited to serial interfaces of the type shown. Interfaces 43 and 52 may be any of a variety of applicable communications interfaces including Ethernet, parallel interfaces, or any other applicable interfaces.

Referring again to FIG. 2, electronic trip unit 42 is coupled to application specific module 35 through a communications line 36. In a preferred embodiment, communications line 36 may be a three meter cable which is a serial communications interface as depicted in FIG. 3. Serial communications interface 36 may include a plurality of communications lines such as serial input/serial output (SI/SO) line, serial output/serial input (SO/SI) line, serial clock (SCK) line and auxiliary power and signals line 37. Auxiliary power and signals line 37 is configured to carry power from ASM 35 to electronic trip unit 42.

As depicted in FIG. 3, serial communication interface 36 is coupled to a monitoring, control, and communication processor 38 of ASM 35. The monitoring, control, and communication processor 38 carries out monitoring, control, and communication functions for ASM 35. The functions include communicating information to and from electronic trip unit 42, transmitting and receiving data from electronic trip unit 42, including information such as, but not limited to, the type of trip encountered, the time of trip, the current values at time of trip, (for example, a trip log). Further, monitoring, control, and communications processor 38 may provide programming information to electronic trip unit 42, such as resetting trip values for electronic trip unit 42 and further may be used to receive real-time data from electronic trip unit 42. Monitoring, control, and communication processor 38 is coupled to a communications module 39 of ASM 35 which may be, in a preferred embodiment, a profibus communications IC SPC-3 communications device and required support electronics.

ASM 35 is coupled to a communications bus 30, such as the RS-485 communications bus depicted in FIG. 3.

To provide functioning of electronic trip unit 42 after a trip or current interruption has occurred, electronic trip unit 42 receives external power through a power line 50 that is coupled to ASM 35 (FIG. 2). ASM 35 supplies power to electronic trip unit 42 through line 37 depicted in FIG. 3. Power line 50 may also supply zone select interlock signals to ASM 37. Power line 50 further powers ASM 35. In a preferred embodiment, ASM 35 is powered by a 24 volt line 50.

A zone selective interlock signal communicated along line 50 allows breakers that are downstream from a particular breaker to be tripped without tripping upstream breakers. This functionality allows an overload condition to be sensed and interrupted without interruption of the entire system. (For example, in an industrial setting it would not be desirable to shut down an entire factory system because a single load device fails thereby tripping a single circuit breaker.)

Figure 4:
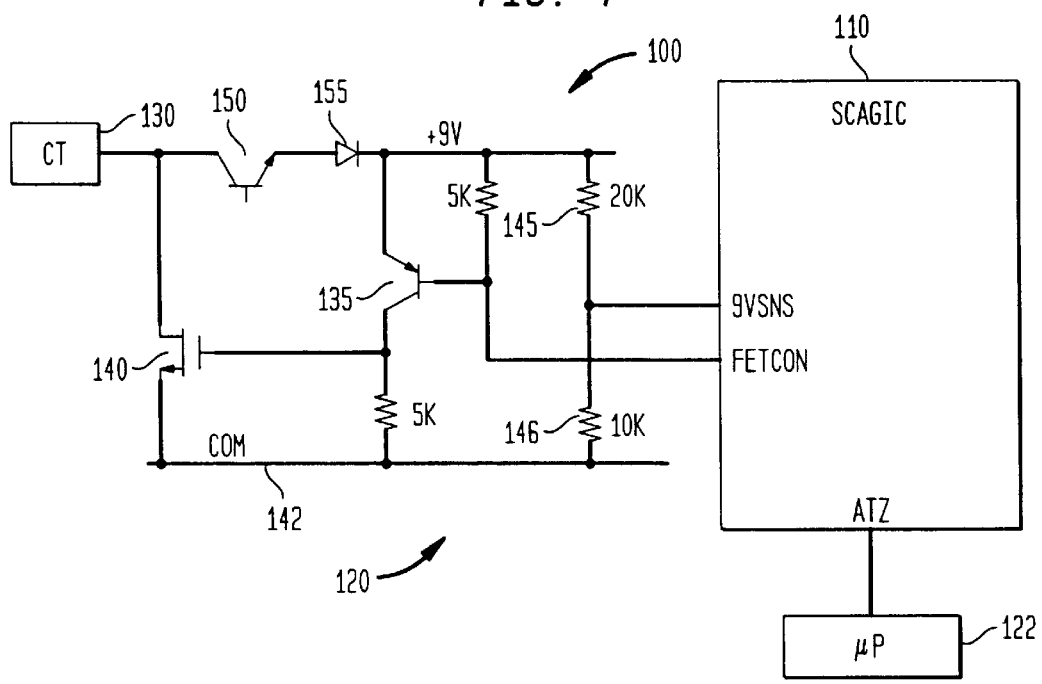
FIG. 4 is a schematic diagram of an auto chopping circuit.
Figure 5:
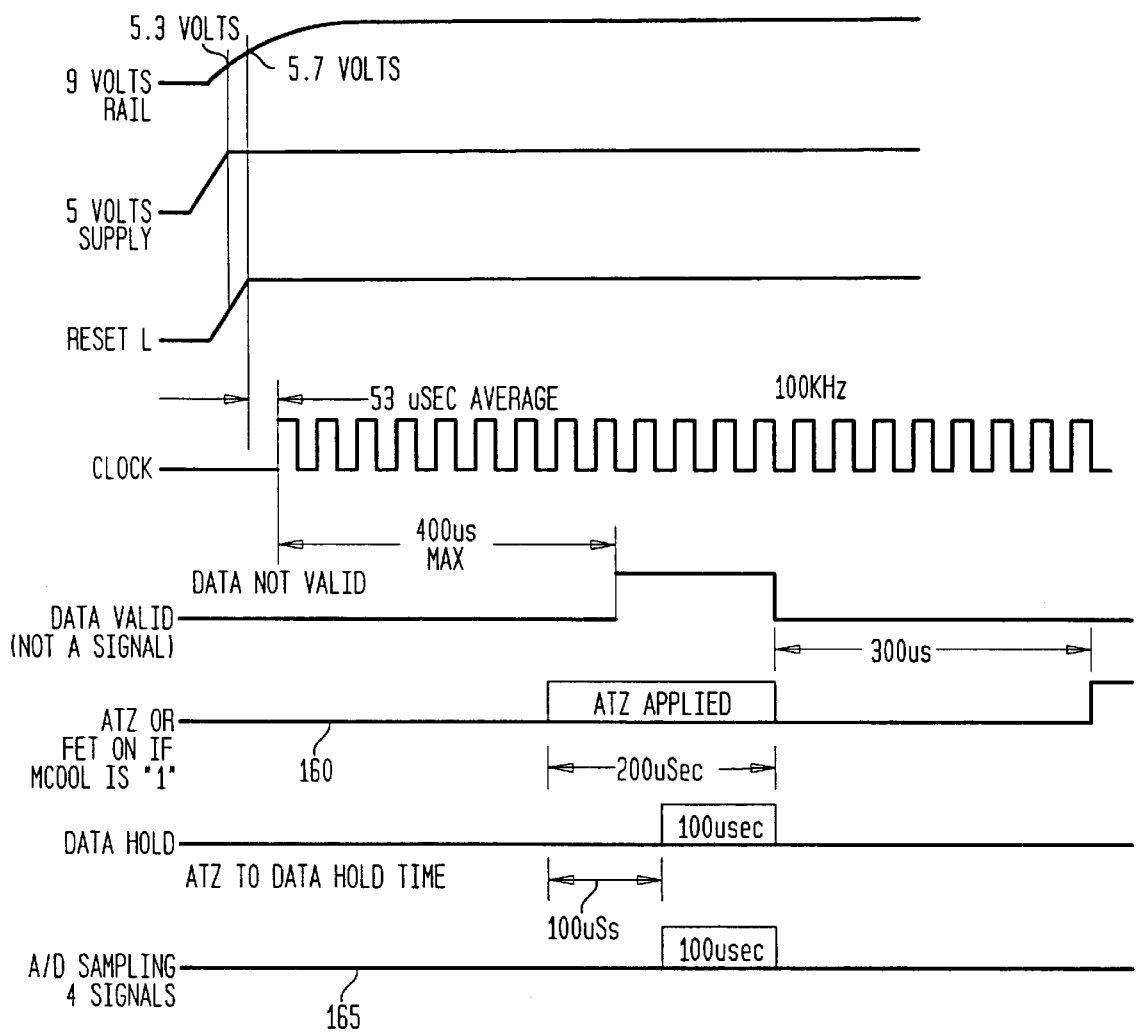
FIG. 5 is a timing diagram showing the microprocessor clock, autozero signal and the sampling time.

Referring now to FIG. 4, a signal conditioning and generation integrated circuit system 100 is depicted. The signal conditioning and generation circuit system 100 is part of electronic trip unit 42 and includes a signal conditioning and generation integrated circuit 110 (SCAGIC) and an auto chopping circuit 120. In a preferred embodiment, signal conditioning and generation integrated circuit is an application specific integrated circuit (ASIC). SCAGIC receives a pulsed signal or an auto zero signal (ATZ) 160 from a microprocessor 122. The ATZ signal is a pulsed signal and in a preferred embodiment is pulsed at 2 kilohertz. The 2 kilohertz frequency is, in a preferred embodiment, substantially the same as the sampling frequency 165 for the data acquisition system. As depicted in FIG. 5, the sampling occurs approximately 100 microseconds after ATZ signal 160 goes high.

In operation, chopping circuit 120 receives a signal source from a current transformer 130 or alternatively from any other discrete energy transducer that includes a signal proportional to the current flowing through the circuit breaker line. In a preferred embodiment, the circuit breaker has a single chopping circuit, such that microprocessor 122 is capable of reading the current from a combined signal of the three (or alternatively four) current transformer signals corresponding to each phase of the circuit. In an alternative embodiment, the circuit breaker has three (3) different chopping circuits, each chopping circuit corresponding to a different phase input line to the circuit breaker. Microprocessor 122 is capable of reading the current from current transformer 130 through the circuit 120. In a preferred embodiment when the current level is approximately 0.707 times the rated current of CT 130 a metering cool (M-Cool) auto chopping feature is initiated by microprocessor 122. When the M-Cool feature is initiated (by pulling the M-Cool pin high), SCAGIC 110 utilizes the ATZ signal 160 which is a pulse signal (FIG. 5) in the M-Cool procedure. In response, SCAGIC 110 provides a field effect transistor (FET) control (FETCON) signal for each pulse of the ATZ signal 160. The FET control signal is provided to the gate of a bus transistor 135 to turn bus transistor 135 on. When bus transistor 135 is in the on state, FET 140 is also turned on. When FET 140 is turned on, a partial short circuit of the CT current is caused. The CT current flows through FET 140 and through a set of test resistors making up a measurement branch, thereby placing a linear load on CT 130. (Transistor 135 and FET 140 make up a switching branch of chopping circuit 100). Avoiding circuit elements 110 and 122 produces a cleaner signal with no current flowing through resistors 145 and 146 therefore allowing more precision measurement of the current signal coming from CT 130.

Because ATZ is running at approximately the same frequency as the sampling frequency, measurements are taken during the time that FET 140 is on or at each ATZ pulse 160 (in a preferred embodiment sampling occurs 100 microseconds after ATZ signal 160 goes high, for a period of 100 microseconds).

By chopping in this manner, that is, substantially short circuiting the current coming from CT 130, CT 130 is running in a linear mode producing better accuracy of current measurements and greater dynamic range for the current measurements.

Circuit breakers of the type commonly associated with circuit breaker 40 are typically low voltage circuit breakers in the range of 600 volts or less, but the communication and control system discussed above may be configured to operate with circuit breakers of any rated voltage. Further, circuit breakers commonly associated with circuit breakers 40 have current ratings from approximately 63 amps up to 1600 amps, however, other rated currents may also be applied. Further, circuit breakers of the type commonly associated with circuit breaker 40 are three phase circuit breakers which may be three pole or two pole circuit breakers; however, single phase circuit breakers may also be used.

Those who have skill in the art will recognize that the present invention is applicable with many different hardware configurations, software architectures, communications protocols, and organizations or processes.

While the detailed drawings, specific examples, and particular formulations given describe preferred embodiments, they serve the purpose of illustration only. The materials and configurations shown and described may differ depending on the chosen performance characteristics and physical characteristics of the chopping circuit and data acquisition system. For example, the type of circuit elements used may differ. The systems shown and described are not limited to the precise details and conditions disclosed. Furthermore, other substitutions, modifications, changes, and omissions may be made in the design, operating conditions, and arrangement of the preferred embodiments without departing from the spirit of the invention as expressed in the appended claims.

What is claimed is:

1. An electrical system, comprising:
   a load running on an alternating current;
   a circuit breaker coupled to the load; and
   a data acquisition system for a circuit breaker, the data acquisition system having a discrete energy transducer providing a source signal related to the current in the circuit breaker;
   a microprocessor;
   a signal conditioning circuit coupled to the microprocessor and configured to receive a periodic signal from the microprocessor; and
   a chopping circuit coupled to the signal conditioning circuit and coupled to the signal source, the chopping circuit configured to chop the source signal in response to the periodic signal, the chopping circuit including:
     a measurement branch coupled to the signal source; and
     a switching branch coupled to the signal conditioning circuit and coupled to the signal source,
       wherein the switching branch is switched in response to the periodic signal and measurement, across the measurement branch, is carried out in response to the periodic signal.

2. The electrical system of claim 1 wherein the signal conditioning circuit includes an application specific integrated circuit.

3. The electrical system of claim 1 wherein the periodic signal is a pulsed signal.

4. The electrical system of claim 1 wherein the measurement branch includes a resistive element.

5. The electrical system of claim 1 wherein the switching branch provides at least a partial short circuit of the source signal.

* * * * *